M. K. SESSLER.
BOLT.
APPLICATION FILED MAR. 29, 1919. RENEWED OCT. 8, 1921.
1,415,487.
Patented May 9, 1922.
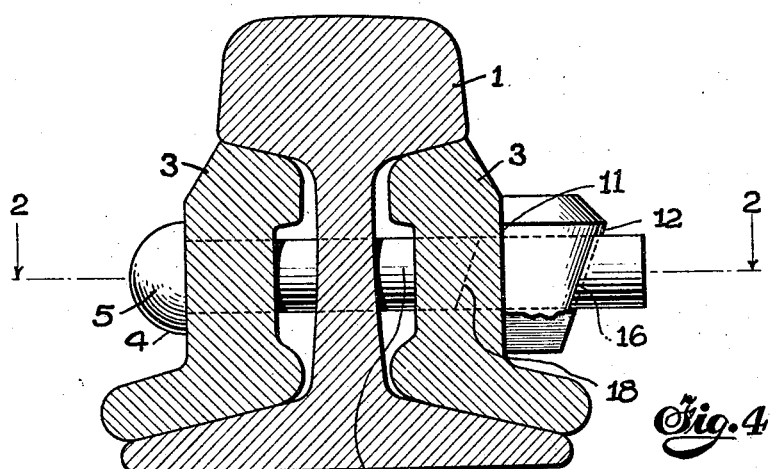
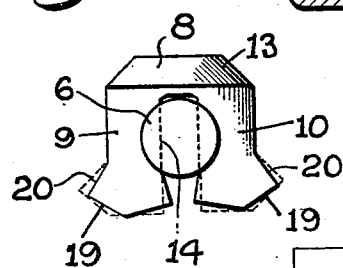
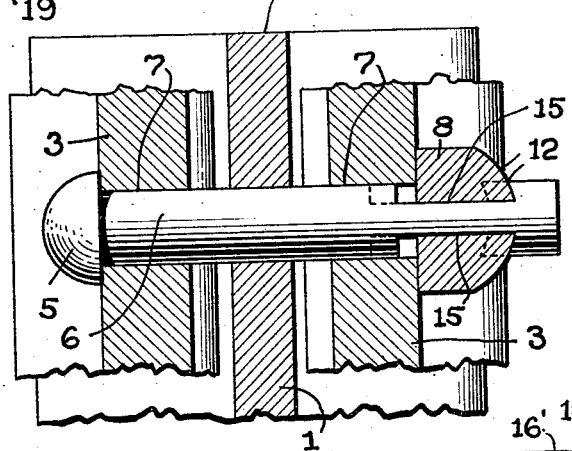
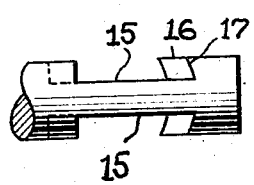
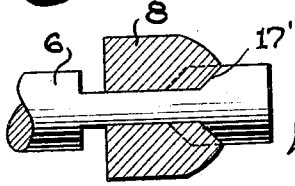
INVENTOR
Marcel K. Sessler
BY
ATTORNEYS

UNITED STATES PATENT OFFICE.

MARCEL K. SESSLER, OF NEW YORK, N. Y.

BOLT.

1,415,487.  Specification of Letters Patent.  Patented May 9, 1922.

Application filed March 29, 1919, Serial No. 286,144. Renewed October 8, 1921. Serial No. 506,486.

*To all whom it may concern:*

Be it known that I, MARCEL K. SESSLER, a citizen of the United States, residing in New York city, county and State of New York, have invented an Improvement in Bolts, of which the following is a specification.

This invention relates to bolts and in particular to splice bolts for rails.

One of the objects is to provide apparatus of the above type which shall be simple in construction and reliable in use.

Another object is to provide apparatus of the above type which may be produced at relatively low cost and which requires a minimum of attention when once applied.

Another object is to provide apparatus of the above type consisting of few parts, and a method of application which shall be relatively inexpensive in execution.

Other objects will be in part obvious and in part pointed out hereinafter.

In the accompanying drawings, wherein are shown, for purposes of illustration, one or more of various possible embodiments of the several features of this invention, Fig. 1, is a view in cross section of one embodiment of my invention.

Fig. 2, is a sectional view taken along the line 2—2 of Fig. 1.

Fig. 3 is an end view of the bolt of Fig. 1, viewed from the right end.

Fig. 4 is a view similar to Fig. 3 of a slightly modified form of the invention.

Fig. 5 is a fragmentary detail view of the end of the bolt of Figs. 1 and 2.

Fig. 6 is a view generally similar to Fig. 5 of a somewhat modified form of bolt with the wedging member in place, and Fig. 7 is a view similar to Fig. 6 of a still further modification.

Referring now to Figs. 1, 2, and 3 of the drawings, I have shown a section of rail 1 having an end 2. Extending in parallelism to said rail, and on opposite sides thereof, are provided the usual splice plates or fish plates 3. A bolt 4, having a head 5 and a shank 6, extends transversely through aligned openings 7 in the splice plates and rail and is firmly secured in place by means of a wedging construction, one form of which will now be described in detail.

This form of my wedging member comprises an integral staple-like element 8 having a cross piece 13 and two legs 9 and 10, the staple on one side of the cross piece being preferably flat and perpendicular to the cross piece as at 11, and on the other side preferably cylindrically convex with the elements sloping the length of the staple as shown at 12. The inner sides of the legs are preferably plane, parallel to each other, and perpendicular to the cross piece 8 as shown at 14.

The bolt is preferably smooth, that is, unthreaded from end to end, and the shank is provided on opposite sides with parallel slots or grooves 15, at one portion of its length, each slot or groove having the side nearest the end of the shank extending obliquely thereof as at 16 and being shaped to form a concave shoulder, as at 17, of a shape complementary to that of the convex surface 12 of the wedging member.

For convenience of manufacture the grooves 15 may be formed by a simple milling or swaging operation forming the side 18 of the slot parallel to side 16.

The legs of the wedging member 8 are preferably enlarged at the outer side of their ends, as at 19, to form an oblique shelf 20. If desired, this shelf construction can be dispensed with on one of the legs, said leg being correspondingly shortened as at 9' in Fig. 4.

In applying my splice bolt construction the bolt is passed through aligned opening 7 in the rail and splice plates until the head 5 abuts one of the splice plates, the width of slots or grooves 15 preferably extending in a vertical plane as shown in the drawings. Thereupon the wedging member 8 is inserted to straddle the bolt at slots 15, the sides 14 of the staple legs closely contacting the said slots throughout substantially the width of the shank as shown in Fig. 3. When the wedging member is forced in place by being driven either from the top or from the side, it becomes firmly engaged with the faces of the slots or grooves 15 in the bolt shank as well as with the shoulders 17 and the face of one of the splice plates as at 11. The re-action of the oblique sides 12 against shoulders 17 of the bolt shank places the bolt under tension and the splice plates are forced into firm engagement with the rail 1, to thereby place them under compression. Thereupon the shelf or shelves 20 are struck with a maul to deflect the inner portion of one or both of the legs 9 and 10 toward the central section of the staple, as clearly shown in Fig. 3, thereby preventing any undesired loosening or removal of the wedging member.

The arrangement of a wedging member convex on one side and fitting against a correspondingly concave shoulder 17, as in Figs. 1, 2, and 5, brings about a substantial initial bearing surface between the wedging member and the bolt and a radial distribution of shearing forces.

In place of the arrangement just described, I may form my shoulder 17 to cooperate with any other staple conformation as for instance that shown in Figs. 6 and 7, in which the shoulder 17' is plane and slopes toward one end of the shank. The latter arrangement causes a distribution of the shearing forces of the wedging member toward the centre of the bolt.

Fig. 4 shows an alternative form of bolt shank 6' which is square rather than circular in cross section.

In Fig. 7 I have shown two parallel serrated series of angular slots 15', disposed similarly to slots 15 extending obliquely of the shank as shown at 16', and co-operating with similar serrations 21' on the innermost sides 14' of the legs of the staple 8'. By this arrangement, the shearing tendency of the wedging member is distributed over a relatively great surface area without materially diminishing the cross sectional area of the bolt at this portion.

If instead of my wedge lock I relied upon lock nuts, washers, or the like, to furnish a secure lock for my bolt, not only would the initial cost be increased, due to added parts, but both the cost of installation and the cost of maintenance would be materially higher.

While my bolt is particularly designed for use in the splicing of rails, it is nevertheless of general application being useful in substantially any relation in which a bolt is employed.

Although I have shown my wedging member staple-like in form it is to be understood that other forms of wedging members may be employed to advantage.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. A lock bolt comprising a bolt member having a head and a shank, and a wedging member cooperating with said shank, said shank being cut away to form diametrically opposite recess faces terminating at the outer ends in shoulders each inclined along the recess face and undercut from the periphery of the shank to said recess face, said wedging member comprising a cross piece and two depending legs, said legs being spaced apart to straddle the neck of said shank, and each being straight on one side, tapered on the other side to form a wedging surface, adapted to cooperate with one of said shank shoulders, and provided at the extremity with a ledge adapted to be bent inwardly, after said wedging member is in position, to engage under said shank.

2. A lock bolt comprising a bolt member having a head and a shank, and a wedging member cooperating with said shank, said shank being cut away to form a recess face terminating at the outer end in a shoulder inclined along the recess face, said wedging member comprising a cross piece and two depending legs, said legs being spaced apart to straddle the neck of said shank, and each being straight on one side, one of said legs tapering on the other side to form a wedging surface adapted to cooperate with said shank shoulder, and one of said legs being provided at the extremity thereof with a ledge adapted to be bent to lock said wedging member in position.

3. A lock bolt comprising a bolt member having a head and a shank, and a wedging member cooperating with said shank, said shank being provided with a shoulder inclined along its juncture with the shank, said wedging member comprising a U-shaped member adapted to straddle said shank and having one side thereof straight, and one leg thereof tapered on the opposite side to from a wedging surface adapted to cooperate with said shank shoulder, and one leg thereof provided at the extremity with a ledge adapted to be bent to lock said wedging member in position.

4. A lock bolt comprising a bolt member having a head and a shank, and a wedging member cooperating with said shank, said shank being cut away to form a recess face terminating at the outer end in a shoulder, said wedging member comprising a U-shaped member adapted to straddle the neck of said shank, and having one leg tapered to form a surface adapted to cooperate with said shank shoulder, and one leg provided at the extremity thereof with a ledge adapted to be bent to hold said wedging member in position.

5. A lock bolt comprising a bolt member having a head and a shank, and a wedging member cooperating with said shank, said shank being cut away to form diametrically opposite recess faces terminating at the outer ends in shoulders each inclined along the recess face and undercut from the periphery of the shank to said recess face, said wedging member comprising a cross piece and two depending legs, said legs being spaced apart to straddle the neck of said shank, and each being straight on one side, tapered on the other side to form a wedging surface adapted to cooperate with one of said shank shoulders, and provided at the extremity with a ledge adapted to be bent to lock said wedging member in position.

6. A lock bolt comprising a bolt member having a head and a shank, and a wedging member cooperating with said shank, said shank being cut away to form diametrically opposite recess faces terminating at the outer ends in shoulders each inclined along the recess face and undercut from the periphery of the shank to said recess face, said wedging member comprising a cross piece and two depending legs, said legs being spaced apart to straddle the neck of said shank, and each being straight on one side and tapered on the other side to form a wedging surface adapted to cooperate with one of said shank shoulders.

7. A lock bolt comprising a bolt member having a head and a shank, and a wedging member cooperating with said shank, said shank being cut away to form opposite recess faces terminating at the outer ends in shoulders each inclined along the recess face and undercut from the periphery of the shank to said recess face, said wedging member comprising a cross piece and two depending legs, said legs being spaced apart to straddle the neck of said shank, and each tapering on one side to form a wedging surface adapted to cooperate with one of said shank shoulders.

8. A lock bolt comprising a bolt member having a head and a shank, and a wedging member cooperating with said shank, said shank being provided with shoulders, each inclined along its juncture with said shank and undercut from its outer edge to its juncture with said shank, said wedging member comprising a U-shaped member adapted to straddle said shank and having each leg tapered to form a wedging surface adapted to cooperate with one of said shank shoulders.

9. A lock bolt comprising a bolt member having a head and a shank, and a wedging member cooperating with said shank, said shank being cut away to form opposite recess faces terminating at the outer ends in shoulders each inclined along the recess face, said wedging member comprising a cross piece and two depending legs, said legs being spaced apart to straddle the neck of said shank, and each being straight on one side, tapered on the other side to form a wedging surface adapted to cooperate with one of said shank shoulders, and provided with a ledge adapted to be bent inwardly, after said wedging member is in position, to engage under said shank.

10. A lock bolt comprising a bolt member having a head and a shank, and a wedging member cooperating with said shank, said shank being cut away to form opposite recess faces terminating at the outer ends in shoulders each inclined along the recess face, said wedging member comprising a cross piece and two depending legs, said legs being spaced apart to straddle the neck of said shank, and each being straight on one side and tapering on the other side to form a wedging surface adapted to cooperate with one of said shank shoulders, one of said legs being provided with a ledge adapted to be bent inwardly, after said wedging member is in position, to engage under said shank.

11. A lock bolt comprising a bolt member having a head and a shank, and a wedging member cooperating with said shank, said shank being cut away to form opposite recess faces terminating at the outer ends in shoulders each inclined along the recess face, said wedging member comprising a cross piece and two depending legs, said legs being spaced apart to straddle the neck of said shank, and each tapering on one side to form a wedging surface adapted to cooperate with one of said shank shoulders, one of said legs being provided with a ledge adapted to be bent inwardly, after said wedging member is in position, to engage under said shank.

12. A lock bolt comprising a bolt member having a head and a shank, and a wedging member cooperating with said shank, said shank being provided at its outer end with a shoulder inclined at its juncture with the shank, said wedging member comprising a U-shaped member adapted to straddle said shank and having one of the legs thereof tapered on one side to form a wedging surface adapted to cooperate with said shank shoulder, and having one of the legs thereof provided at its extremity with a ledge adapted to be bent inwardly, after said wedging member is in position, to engage under said shank.

13. A lock bolt comprising a bolt member having a head and a shank, and a wedging member cooperating with said shank, said shank being provided near the free end thereof with a shoulder, said wedging member comprising a U-shaped member adapted to straddle said shank and having one leg thereof positioned to engage said shoulder, one leg of said U-shaped member being provided at the extremity thereof with a ledge adapted to be bent inwardly, after said wedging member is in position, to engage under said shank.

14. In a rail splice, a combination, a rail, a splice plate parallel thereto, and overlapping the end thereof, a bolt passing transversely of said rail and said plate, a rigid staple-like member straddling said bolt, said member having a shelf integral with one leg thereof, whereby a blow upon said shelf will distort said member to positively prevent its removal from said bolt.

15. In a rail splice, in combination, a rail, a splice plate parallel thereto, and overlapping the end thereof, a bolt passing transversely of said rail and said plate, a rigid staple-like member straddling said bolt, means to prevent relative rotation between said bolt and said straddling member, said member having an integral shelf on each leg, whereby a blow upon said shelf will distort said member to positively prevent its removal from said bolt.

16. In combination, two metallic plates, a bolt passing transversely thereof, a staple formed wedge straddling said bolt, said bolt being grooved to accommodate the legs of said wedge, one face of said wedge resting against one of said plates and one of said legs having a shelf, as and for the purpose described.

17. In a rail splice, in combination, a rail, a pair of splice plates parallel thereto, on opposite sides of the rail end, a bolt extending transversely of said plates and said rail, and having a head substantially against one of said plates, a staple-formed wedging member straddling said bolt, said bolt being slotted to fit an effective wedge face on each leg of said wedging member, the other effective wedge faces being pressed against the adjoining splice plate, each said leg having a shelf as and for the purpose described.

18. In a rail splice, in combination, a rail, a pair of splice plates parallel thereto, on opposite sides of the rail end, a bolt extending transversely of said plates and said rail, and having a head substantially against one said plate, a staple-formed wedging member straddling said bolt, said wedging member having a plane vertical face, and a convex oblique face, said bolt being slotted to fit the convex wedge face on each leg of said staple, the plane wedge faces being pressed against the adjoining splice plate, and means for positively preventing removal of said wedge member.

19. As an article of manufacture a lock bolt, comprising a bolt member having a head and a shank, said shank having faces extending obliquely thereof, and a staple-like wedging member adapted to straddle said bolt with its legs in contact with said faces, one said leg having a shelf as and for the purpose described.

In testimony whereof, I have signed my name to this specification this 22 day of March, 1919.

MARCEL K. SESSLER.